United States Patent
Fleming et al.

(12)

(10) Patent No.: US 6,555,265 B1
(45) Date of Patent: Apr. 29, 2003

(54) VALUE REGULATED LEAD ACID BATTERY

(75) Inventors: Frank Albert Fleming, Warrensburg, MO (US); Russell Harvey Newnham, Mount Waverly (AU)

(73) Assignee: Hawker Energy Products, Inc., Warrensburg, MO (US); part interest ( * ) Notice: Subject to any disclaimer, the term of this patent is extended or adjusted under 35 U.S.C. 154(b) by 0 days.

(21) Appl. No.: 09/707,753

(22) Filed: Nov. 6, 2000

Related U.S. Application Data (60) Provisional application No. 60/195,079, filed on Apr. 6, 2000.

(51) Int. Cl.[7] .............................................. H01M 2/24
(52) U.S. Cl. ..................... 429/160; 429/153; 429/178; 429/204
(58) Field of Search ................. 429/211, 153, 429/160, 178, 204

(56) References Cited

U.S. PATENT DOCUMENTS

| | | | | |
|---|---|---|---|---|
| 2,511,943 A | * | 6/1950 | Reed | |
| 3,518,127 A | * | 6/1970 | Aronson | |
| 4,425,414 A | | 1/1984 | Solomon | 429/179 |
| 4,603,093 A | | 7/1986 | Edwards et al. | 429/54 |
| 4,760,001 A | | 7/1988 | Nann et al. | 429/136 |
| 4,983,475 A | | 1/1991 | Delans | 429/160 |
| 5,230,967 A | | 7/1993 | Radmall | 429/152 |
| 5,256,502 A | | 10/1993 | Kump | 429/150 |
| 5,318,864 A | * | 6/1994 | Shannon et al. | 429/160 |
| 6,013,388 A | | 1/2000 | Stadnick et al. | 429/120 |

FOREIGN PATENT DOCUMENTS

| | | |
|---|---|---|
| EP | 83330 A | 7/1983 |
| EP | 442599 A | 8/1991 |
| EP | 459037 A | 12/1991 |
| GB | 1590947 | 6/1981 |
| WO | WO9940638 | 8/1999 |

OTHER PUBLICATIONS

PCT Written Opinion, Appln. No. PCT/US00/41934 Date of Mailing: Apr. 4, 2002.
PCT International Search Report, Appln. No. PCT/US00/41934 Date of Completion: Jul. 4, 2001 Date of Mailing: Jul. 11, 2001.

* cited by examiner

Primary Examiner—John S. Maples
(74) Attorney, Agent, or Firm—Jonathan A. Bay

(57) ABSTRACT

A valve-regulated lead acid (VRLA) battery cell (2,40) has positive and negative plates (10,11,41,42) separated by separator media (12,43) and held together under pressure. The separator is adapted to support therein an electrolyte. Each plate has a first single or plurality of tabs (12,13,46) on a first side and a second single or plurality of tabs (15,16,47) on a second side of the plate, each tab being connected to a busbar (17,18,49,50) to form positive and negative busbars on each of the first and second sides of the plate. The cell may be alternatively configured in a spirally-wound arrangement or in a prismatic arrangement of flat plates. The cell may be constructed of a plurality of such positive and negative plates. A VLRA battery (1, 40) may be constructed of one or a plurality of such VLRA cells, in which case the busbars of neighboring cells are connected by welded joints. The busbars are serviced by at least plural pairs of positive and negative terminals (24,25,33,34,52,53,54,55).

22 Claims, 9 Drawing Sheets

VALUE REGULATED LEAD ACID BATTERY

CROSS-REFERENCE TO PROVISIONAL APPLICATION(S)

This application claims the benefit of U.S. Provisional Application No. 60/195,079 filed Apr. 6, 2000.

BACKGROUND OF THE INVENTION

The present invention relate to valve-regulated lead-acid (VRLA) batteries that are suitable for use in hybrid electric vehicles (HEVs) and electric vehicles (EVs).

Exhaust emissions from transport vehicles are a major cause of both greenhouse gas build-up and urban pollution. Concern over these issues has resulted in the introduction of new anti-pollution legislation that significantly restricts exhaust emissions from internal combustion engines. Some countries have been more severe in their approach and have legislated that a certain number of vehicles sold must have either low or zero emissions. Such vehicles include electric vehicles (EVs) and hybrid electric vehicles (HEVs). The success of this initiative hinges on the development of vehicles that have both appropriate performance and lifetime cost characteristics.

HEV battery packs are subjected to multiple charge-discharge cycles below a full state-of-charge (SoC). Such duty can cause a localized, irreversible build-up of lead sulphate. This impairs battery performance. Similar buildups, along with associated high temperatures and uneven temperature gradients can also occur within EV batteries that are subjected to rapid recharge and discharge conditions.

The specification of U.S. Pat. No. 4,760,001 discloses a battery comprising negative plates made from expanded lead-coated copper having tabs formed by a copper strip extending across the plate. In one form of the battery, the copper strip extends beyond exposed edges of the negative plate to form lugs or tabs on opposite sides of the plate. This leads to sub-optimal location of the tabs with respect to drainage of current and heat. Furthermore, lead-coated expanded copper plate are considerably more expensive to make than expanded lead plates. In addition, such batteries would not be suited to HEV or EV use because of their high cost and additional weight.

The specification of U.S. Pat. No. 4,983,475 discloses a battery design in which each plate has dual tabs on opposed sides and each tab is connected to a corresponding negative or positive busbar. Each of the busbars are in turn connected by diagonally disposed straps. The purpose of the dual tabs and straps is to improve the electrical characteristics of the battery. However, the batteries described in the specification would not be suitable for HEV and EV use because they are only 2 volt batteries and the straps add unnecessary weight. Furthermore, the straps absorb valuable space.

The specification of U.S. Pat. No. 4,603,093 discloses battery cells having two or more tabs per plate. The purpose of the multiple tabs is to improve energy density and power density. This design permits the use of longer shallower plates than previously contemplated. However, the multiple tabs are located on one side of the plate.

The specification of WO 99/40,638 describes cells having plates of the opposite geometry as that described in the specification of U.S. Pat. No. 4,603,093. In other words, the plates are narrow and deep. In order to improve the availability of current from cells containing plates of this design, tabs are placed on opposite sides of the plate and current from one end is transferred to the other by means of a lead-plated copper strap. This improves current availability because copper is a better conductor than lead. Although this design includes tabs on opposed sides of the plate, it does not contemplate terminals on opposed sides of the battery. Consequently, current still has to be transferred from one side of the plate to the other in order to connect with the relevant terminal. Furthermore, the strap adds to the weight of the battery.

SUMMARY OF THE INVENTION

In one aspect, the present invention provides a valve regulated lead acid (VRLA) cell comprising a positive and negative plate separated by a separator and held together under pressure. Preferably, the pressure applied to the cell lies in the range from 20 to 100 kPa. The separator supports therein an electrolyte. Each plate has a first single or plurality of tabs on a first side of the plate, and a second single or plurality of tabs on a second side of the plate. Each tab is connected to a busbar to form positive and negative busbars on each of the first and second sides of the plate.

The cell may be a spirally-wound cell, or a prismatic cell. The spirally-wound cells may be either 2V cells, or manufactured to produce monoblocs with a total voltage of 4 and higher. Spirally-wound cells have current takeoffs at both the top and bottom of the both negative and positive plated (hitherto referred to as spirally-wound batteries with bi-directions current takeoffs). The prismatic cell preferably includes a plurality of such positive and negative plates separated by separators. A plurality of cells may be connected in series.

In another aspect, the invention provides a VRLA battery comprising a plurality of cells joined in series, wherein each cell includes one or more positive and negative plates separated by one or more separators and held together under pressure. Preferably, the pressure applied to the cell lies in the range from 20 to 100 kPa. The separator supports therein an electrolyte. Each plate has a first single or plurality of tabs on a first side of the plate, and a second single or plurality of tabs on a second side of the plate. Each tab is connected to a busbar to form positive and negative busbars on each of the first and second sides of the plate. Each cell may be connected to a neighboring cell by welded joints between alternate positive and negative busbars. These welds are preferably, but not exclusively, through the cell-case wall or over the top of the cell wall. Each cell may be independently sealed airtight. Alternatively, all the cells in the battery may have a common head-space. A plurality of batteries may be connected in series.

The separator used in the invention can be made of absorptive-glass micro-fiber, or can be compatible with the use of gelled-electrolyte. Alternatively, any separator material that can withstand reasonable levels of compression (for example, pressure greater than 20 kPa) is suitable.

In another aspect, the invention provides an electric or electric hybrid vehicle (eg., EV or HEV) that includes one or more such cells or batteries.

The invention provides several advantages. VRLA cells and batteries of the invention are light-weight and low cost. Such cells and batteries have the capacity to deliver substantial current flows while in a partial-state-of-charge (PSoC) condition over a large number of cycles. Also, under high charge and discharge conditions, cells and batteries according to the present invention maintain a much lower and almost isothermal internal battery temperature, compared to that experienced in prior art designs. The dual-tab design does not develop significant temperature gradients during either HEV or PSoC/fast-charge EV duty and does not suffer from preferential sulphation. All these features provide distinct advantages for vehicles applications.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
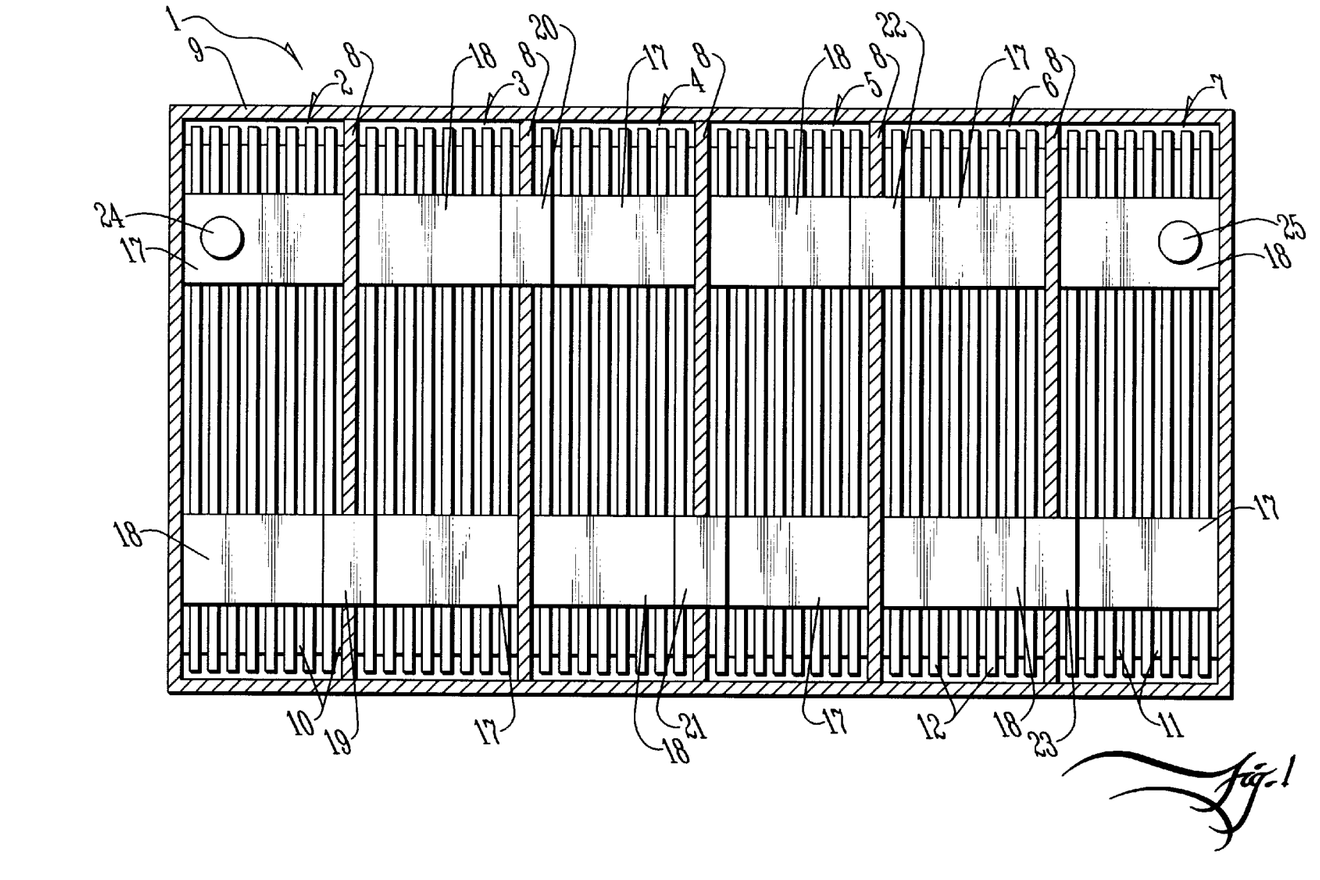
FIG. 1 is a top plan view of a valve-regulated lead acid battery in accordance with the invention having a dual-tab, flat-plate arrangement, wherein a lid of the battery case is removed from the view to better show the interior arrangement.
Figure 3:
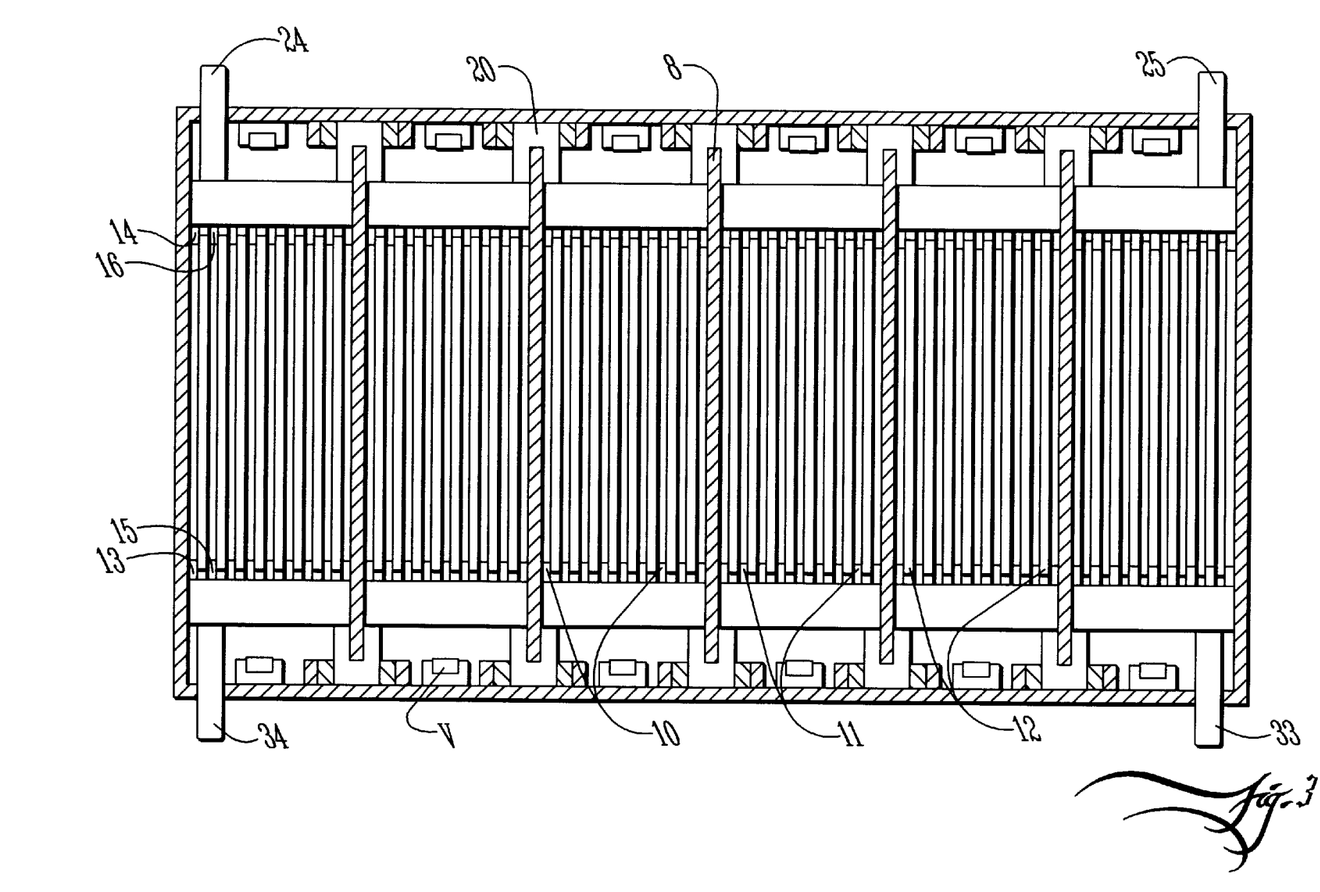
FIG. 3 is a side elevation view the dual-tab, flat-plate battery of FIGS. 1 and 2 except with the near sidewall of the battery case being removed from the view partly to show better the inter-cell welding, which is arranged vis-a-vis over the cell wall partitions.

FIG. 1 is a top plan view of a valve-regulated lead acid (VRLA) battery 1 in accordance with the invention, which in general comprises a flat-plate arrangement. The battery 1 has six cells 2 to 7. Each cell is separated from a neighboring cell by means of cell partitions 8. The cells are encased in a battery casing 9. Each cell comprises negative plates 10 separated from positive plates 11 by means of separators 12. As shown in FIG. 3, each negative plate has tabs 13 and 14 protruding from opposite sides. Similarly, each positive plate has tabs 15 and 16 protruding from opposite sides.

Referring back to FIG. 1, each of the tabs 16 attached to the positive plates are connected to positive busbars 17 and each of the tabs 14 attached to the negative plates are connected to negative busbars 18.

Figure 4:
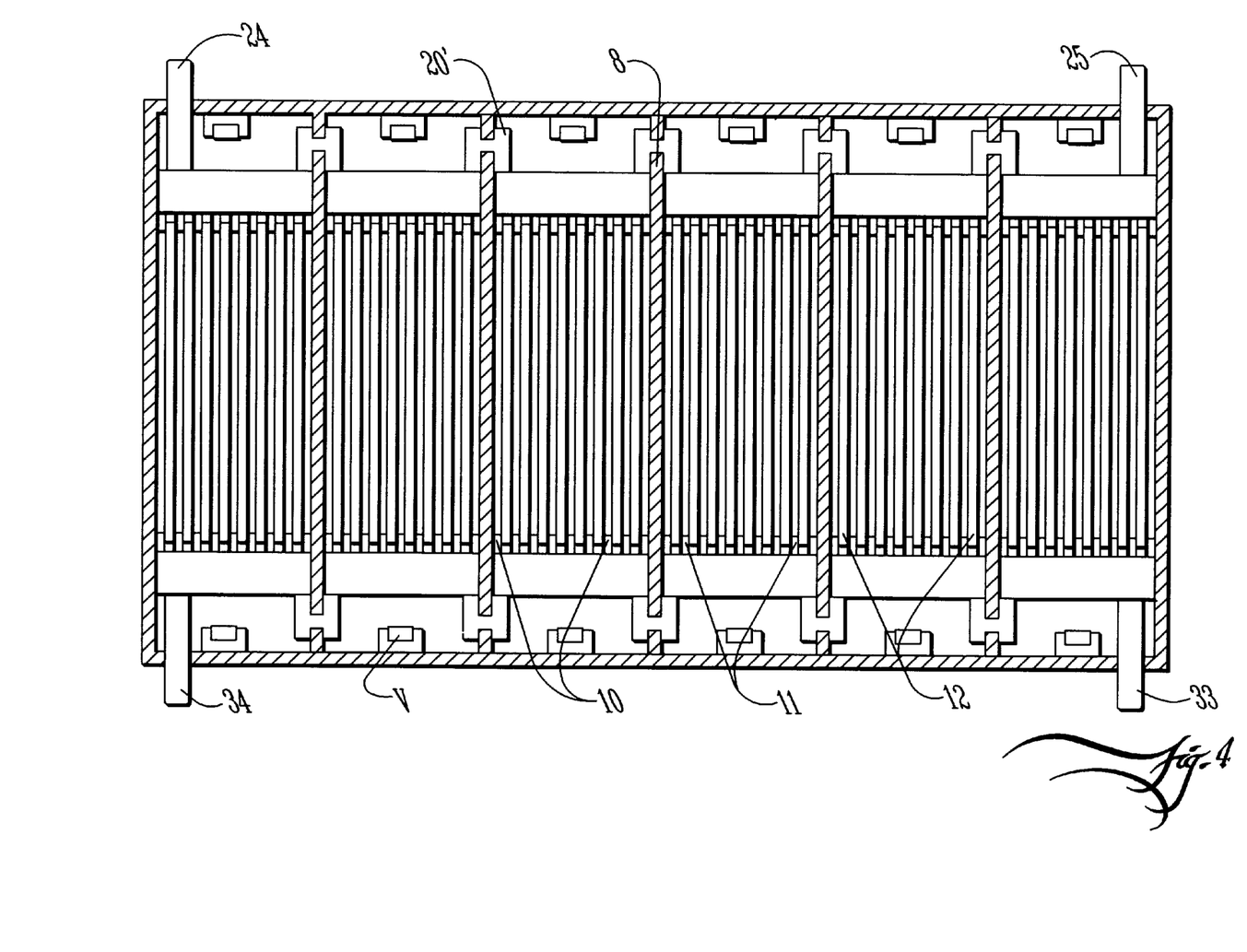
FIG. 4 is a side elevation view comparable to FIG. 3 except showing an alternate arrangement of inter-cell welding, which in this view is arranged not over but through the cell wall partitions.

The negative busbar 18 of cell 2 is connected to positive busbar 17 of cell 3 by means of inter-cell welded joint 19. Likewise the negative busbar 18 of cell 3 is connected to the positive busbar 17 of cell 4 by welded joint 20. And so on, such that, similarly, cells 4, 5, 6 and 7 are connected to each other by weld joints 21, 22 and 23, thereby connecting each of the cells in series to form a battery having a nominal capacity of 12 volts. FIG. 3 shows better the inter-cell welding such as arranged vis-a-vis over the cell wall partitions. FIG. 4 is a comparable view to FIG. 3 except showing an alternate arrangement of inter-cell welding (ie., 20'), which in this view is arranged not over but through the cell wall partitions. In FIG. 1, a terminal 24 is connected to the positive busbar 17 of cell 2 and a terminal 25 is connected to the negative busbar 18 of cell 7.

Figure 2:
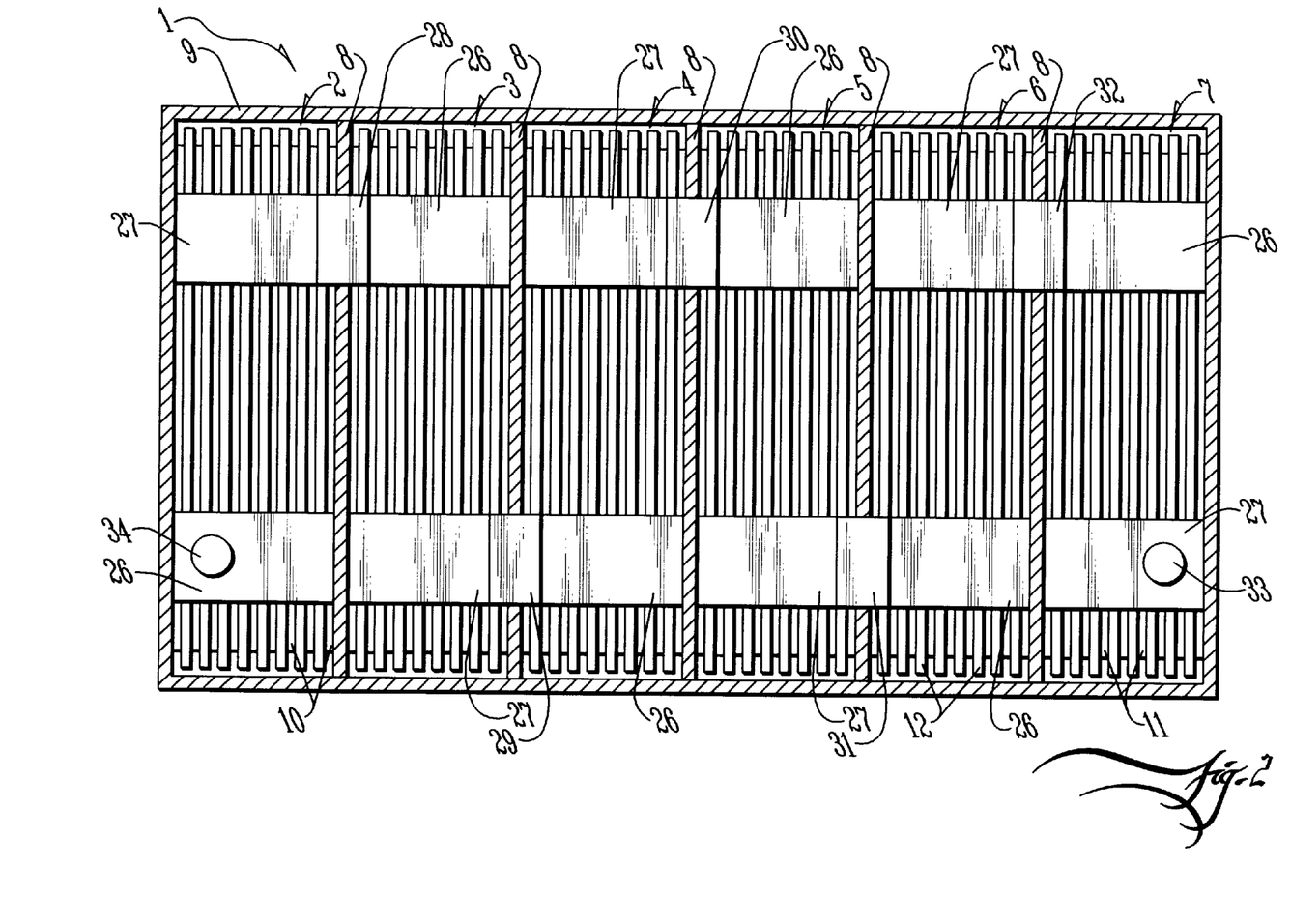
FIG. 2 is a bottom plan view of the dual-tab flat-plate battery of FIG. 1 except with a base of the battery case being removed from the view.

When viewed from the bottom as in FIG. 2, the battery has a similar structure with positive busbars 26 connected to positive tabs 15 that are attached to the positive plates and negative busbars 27 connected to tabs 13 that are attached to the negative plates. Similarly, cells 2, 3, 4, 5, 6 and 7 are connected by welded joints 28, 29, 30, 31 and 32 on alternate sides of the battery. FIG. 2 also shows that busbar 26 of cell 2 has positive terminal 34 connected to it and negative busbar 27 of cell 7 has negative terminal 33 connected to it. Therefore, referring to both FIGS. 1 and 2, the battery 1 has two positive terminals and two negative terminals, as shown by either FIG. 3 or 4 in a single view, which latter views also show that the cells are provided with relief-valves "V."

In operation, current is drawn from the top and the bottom of each plate through busbars on the top and the bottom of the cell through the busbars into respective positive and negative terminals, thereby providing a much shorter path on average from the plate to a terminal. This minimizes the generation of heat as a result of resistive effects. Similarly, this design provides shorter path for dissipation of heat from the plates through the busbars and out through the terminals.

Figure 5A:
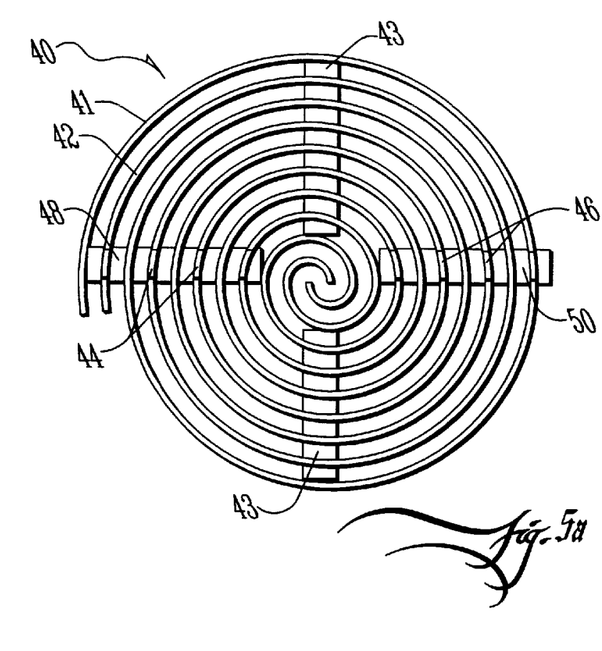
FIG. 5a is a top plan view of an alternate embodiment of a valve-regulated lead acid battery in accordance with the invention having a spirally-wound cell arrangement with bidirectional current takeoffs, showing both positive and negative busbars.
Figure 5B:
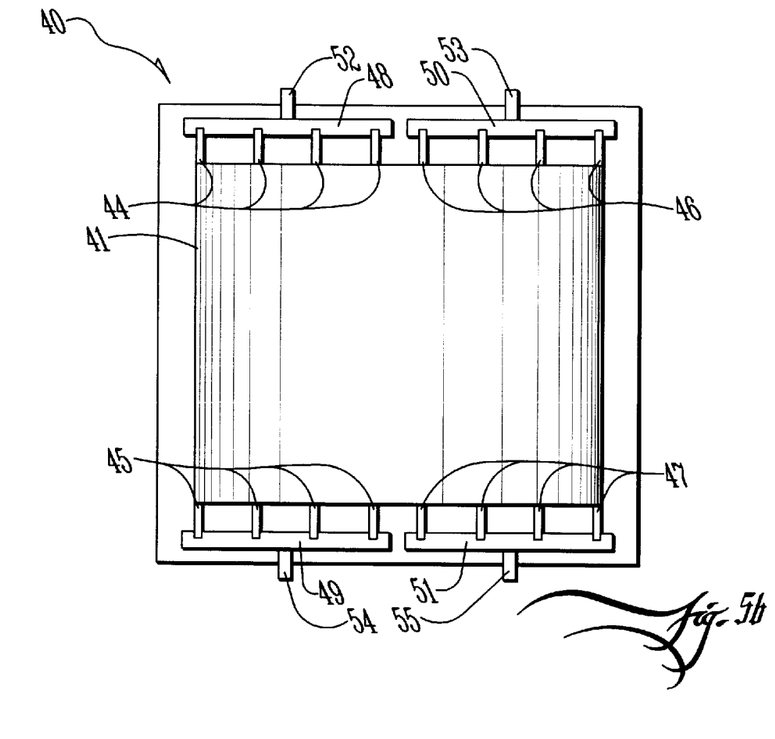
FIG. 5b is a side elevation view of a spirally-wound cell with bidirectional current takeoffs of FIG. 5a, showing busbars at both the top and bottom of the unit.

FIG. 5a is a top plan view of another embodiment of a VRLA battery 40 in accordance with the invention, comprising an arrangement of spirally-wound plates. The battery 40 comprises a negative plate 41, a positive plate 42 and a separator 43. As seen in FIG. 5b, the positive plate 42 has four positive plate tabs 44 at the top and four positive plate tabs at the bottom. Similarly, negative plate 41 has four negative plate tabs 46 at the top and four negative plate tabs 47 at the bottom.

The positive plate tabs 44 are connected to positive busbar 48 at the top of the battery and positive plate tabs 45 are connected to positive busbar 49 at the bottom of the battery. Similarly, negative plate tabs 46 are connected to negative busbar 50 at the top of the battery and the negative plate tabs 47 are connected to negative busbar 51 at the bottom of the battery.

Positive busbar 48 is connected to positive terminal 52, negative busbar 50 is connected to negative terminal 53, positive busbar 49 is connected to positive terminal 54 and negative busbar is connected to negative terminal 55.

It will be appreciated that tabs 44 and 45 at the top and bottom respectively of positive plate 42 are spaced at distances that decrease as the interior of the spirally bound battery is approached so that tabs 44 and 45 coincide with busbars 48 and 49 respectively. Clearly, therefor, the exterior of the spirally wound plate will not drain as well as the interior. This problem could be overcome by providing additional busbars and corresponding tabs at the outer ends of the spirally wound plates.

FIGS. 6 through 9 provide graphical evaluation of how the flat-plate dual-tab battery 1 in accordance with the invention compares to a representative single-tab battery of the prior art under various conditions representative of HEV duty in some instances and EV duty in another.

By way of background, HEV battery packs are required to operate for many cycles below a full SoC. They are also subjected to high charge and discharge currents. The operation of commercially available, VRLA batteries under such duty has been shown to result in localized irreversible formation of lead sulphate in battery plates.

As stated, a flat-plate version of the dual-tab battery 1 in accordance with the invention has been evaluated along-side a representative single-tab battery of the prior art of equivalent size, weight and capacity and under a simulated HEV profile that is known to encourage the formation of localized, "refractory" lead sulphate. The test cycle would involve the following steps:

(i) discharge (2C rate) to 50% SoC;

(ii) charge at specified rate (ie., 2C~21½ A; 4C~43 A) for 1 minute;

(iii) rest at open circuit for 10 seconds, (iv) discharge at specified rate (2C~21½ A; 4C~43 A) for 1 minute;

(v) rest at open circuit for 10 seconds;

(vi) repeat (ii)–(v) until voltage decreases to 10 V at the end of step (iv) or increases to 15 V at the end of step (ii).

(Note:—all charges and discharges are based on Ahs).

Figure 6:
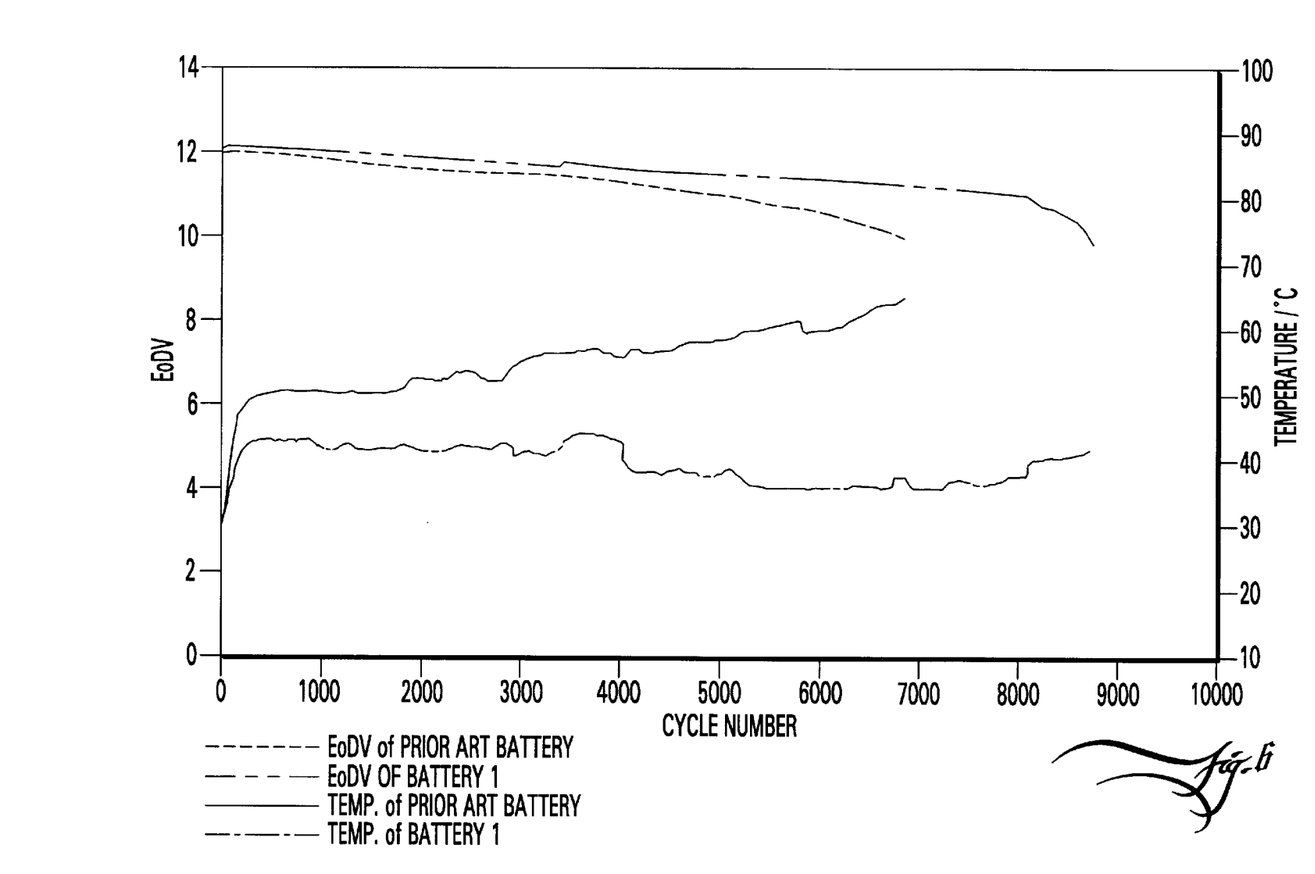
FIG. 6 is a graph showing both end of discharge voltage (EoDV) and temperature (T) profiles, as graphed against number of test cycles, to afford comparison between a representative single-tab battery of the prior art and a flat-plate dual-tab battery in accordance with the invention, under conditions representative of an HEV cycle rate of 2C.

To turn to FIG. 6, it is a graph showing both end of discharge voltage (EoDV) and temperature (T) profiles, as graphed against number of test cycles, to afford comparison between the representative single-tab battery of the prior art and the flat-plate dual-tab battery 1 in accordance with the invention, under conditions representative of an HEV cycle rate of 2C (ie., charge and discharge occurring at a specified rate, which here corresponds to about 21½ A).

When subjected to the foregoing 2C HEV duty, what happened was the prior art battery and the inventive battery 1 delivered 6900 and 8800 HEV cycles, respectively, before their end-of-discharge-voltages (EoDV's) dropped to 10 V (FIG. 6) and equalization charging was required. The higher number of cycles gotten by battery 1 in accordance with the invention represents a 25% decrease in the frequency of equalization. Such improvements are required by HEV manufacturers, so that negative plates are no longer a weak point in HEV batteries, thereby allowing equalization charging of the batteries to be performed during routine vehicle servicing or eliminated entirely.

Now to turn to the matter of temperatures, the temperature of the prior art battery, measured externally at the side of the battery case, increased gradually during operation and reached 65° C. at the completion of 6900 HEV cycles (FIG. 6). Previous studies have shown that the internal temperatures of batteries can be up to 20° C. higher than external temperatures under such duty. Hence, it is considered likely that continued operation of the prior art battery could have resulted in thermal runaway, a condition that can have severe safety implications.

The temperature of the battery 1 in accordance with the invention remained at 38±2° C. through out its cycling period (FIG. 6). This is almost 30° C. cooler than that of the prior art battery. Obviously, the battery 1 in accordance with the invention is much less susceptible to temperature increases (and therefor, thermal runaway) under extended HEV operation than the prior art battery. This performance characteristic is very attractive to HEV manufacturers as the cooling requirements are much simplified. Also, the lower operating temperature should reduce both corrosion of the positive grid and degradation of the expander used in the negative plate. Moreover, it will minimize the internal resistance of the battery 1 in accordance with the invention.

In summary, the operating temperature of the battery 1 in accordance with the invention under HEV duty is much reduced relative to that of representative prior art batteries having just single current takeoffs. The inventive battery 1 provides a considerably longer cycling period between equalization charges than the prior art battery, a factor that is also very attractive to HEV manufactures.

Figure 7:
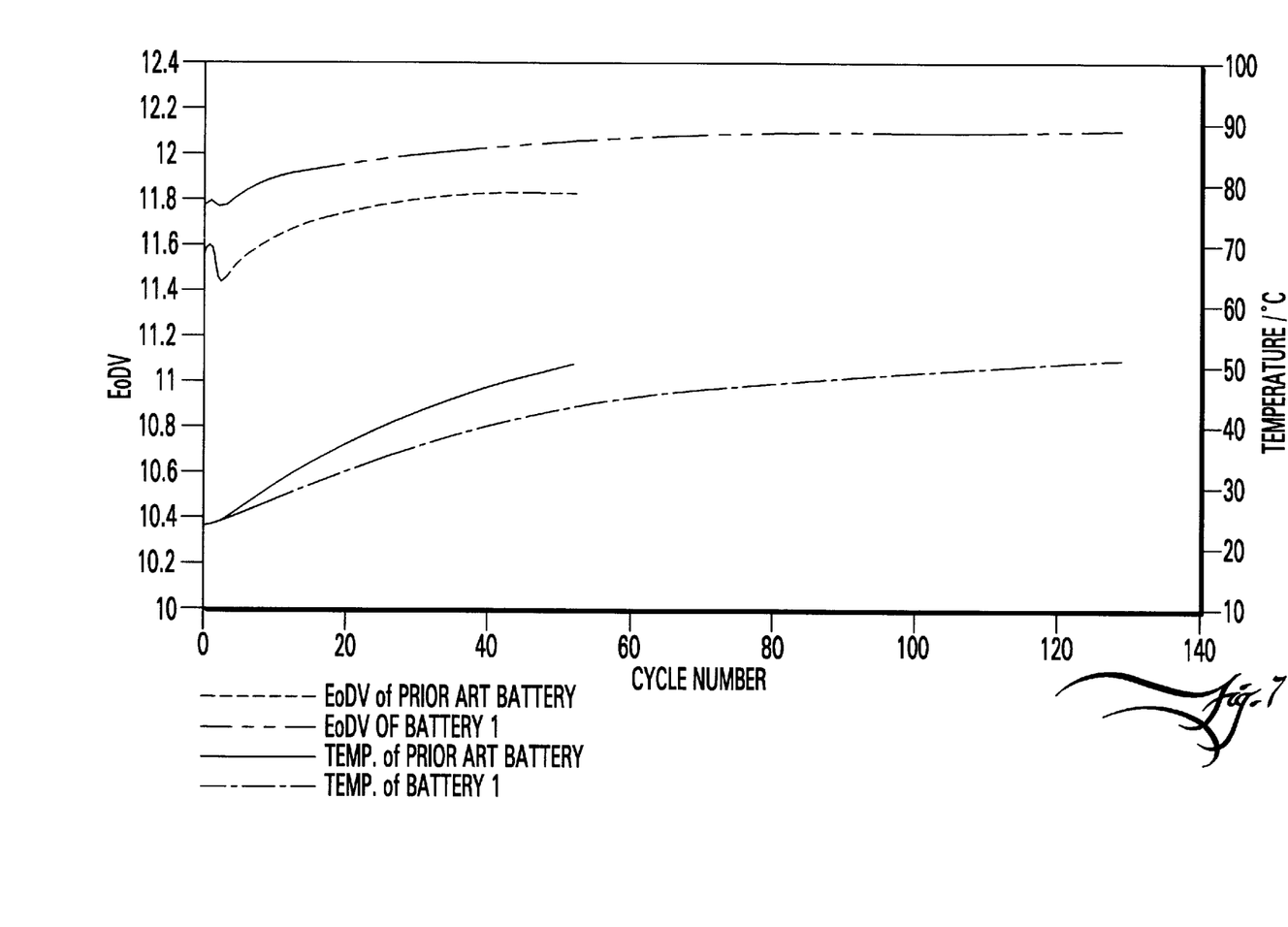
FIG. 7 is a comparable graph showing end of discharge voltage (EoDV) and temperature (T) profiles, as graphed against number of test cycles, to afford comparison between the given single-tab battery of the prior art and the flat-plate dual-tab battery in accordance with the invention, except under conditions representative of an HEV cycle rate of 4C.

FIG. 7 is a graph comparable to FIG. 6 in that it likewise shows end of discharge voltage (EoDV) and temperature (T) profiles, as graphed against number of test cycles, for comparison of the given single-tab battery of the prior art to the flat-plate dual-tab battery in accordance with the invention, except under conditions representative of an HEV cycle rate of 4C.

More particularly, the performance of the test battery 1 in accordance with the invention and the prior art battery were evaluated under an HEV duty (see above) with a charge and discharge rate of 4C. The increase in charge and discharge rate from 2C to 4C was expected to cause a considerable increase in the operating temperature of the batteries. Hence, as a precaution, a temperature probe was inserted in both batteries in the middle of the third cell (from the positive terminal) between the most central negative plate and adjacent separator. The temperature was also monitored externally at the hottest area on the case.

After 50 cycles, the external and internal temperatures of the prior art battery reached 50 and 70° C. respectively (FIG. 7). At this state, it was considered that continued operation of the battery would likely result in thermal runaway, and in the interests of safety, it was removed from service. By contrast, the battery 1 in accordance with the invention operated for 120 cycles before the same external temperature limit was reached. Hence, as with 2C HEV operation (see above), the presence of the second current takeoff significantly reduces the operating temperature of the battery 1 in accordance with the invention, relative to that of the representative prior art battery having only one tab per plate.

Figure 8:
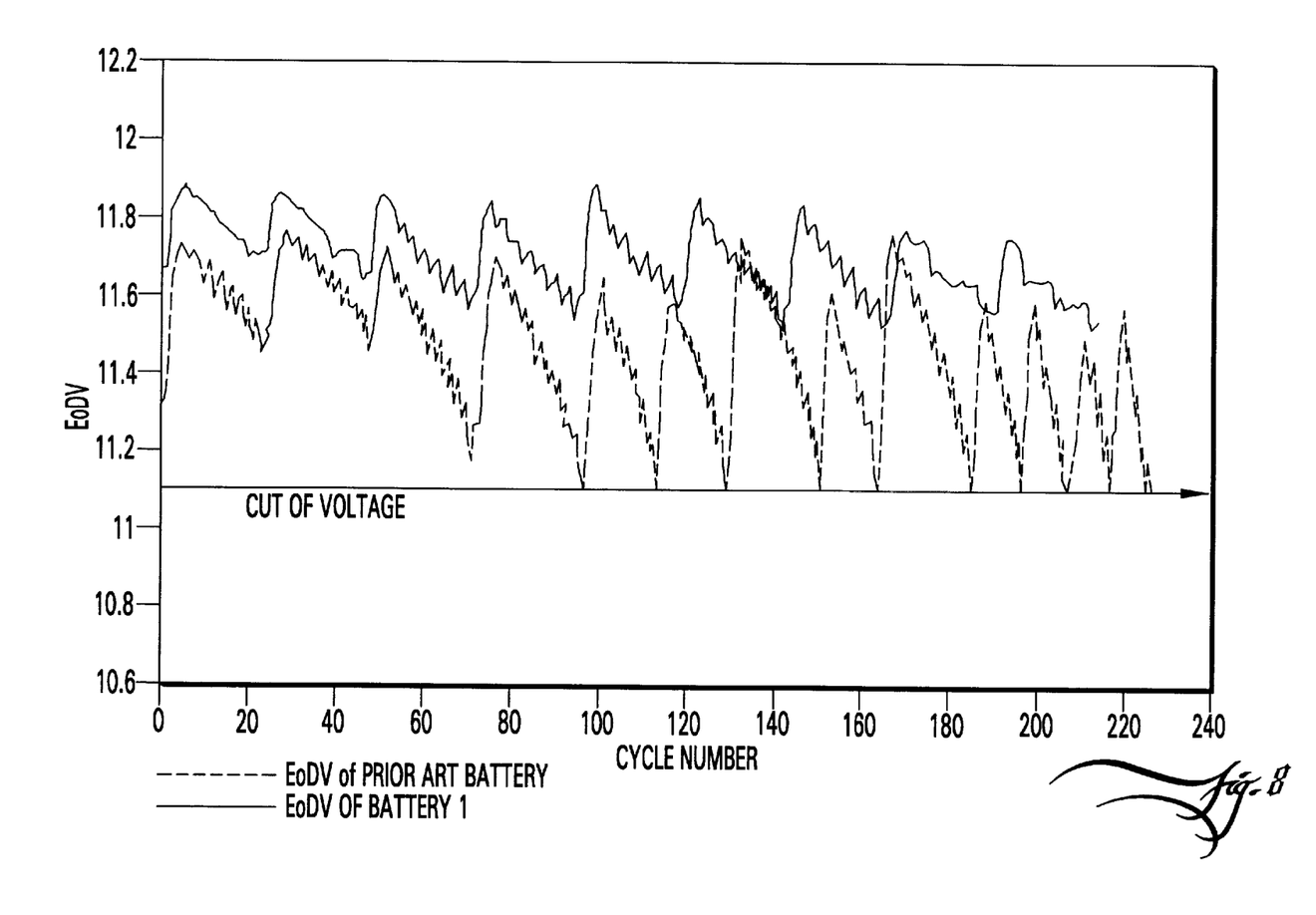
FIG. 8 is a graph showing only end of discharge voltage (EoDV) profiles, as graphed against number of test cycles, to afford comparison between the given single-tab battery of the prior art and the flat-plate dual-tab battery in accordance with the invention, under conditions representative of PSoC/fast-charge EV duty.

FIG. 8 is a graph showing only end of discharge voltage (EoDV) profiles, as graphed against number of test cycles, to afford comparison between the given single-tab battery of the prior art and the flat-plate dual-tab battery in accordance with the invention, except here under conditions representative of partial state-of-charge (PSoC)/fast-charge EV duty.

By way of background, fast charging has been demonstrated as a method for overcoming the limited range of lead-acid powered EVs. Also, previous studies have shown that PSoC operation (eg., continued cycling below a full SoC) can offer remarkable improvements in cycle-life/lifetime energy, available from selected VRLA batteries. It is also now known that the combination of fast-charge and PSoC duty can improve both the effective range of EVs, and the cycle-life/lifetime energy of the battery pack. As this type of EV operation is similar to HEV duty, ie., fast charge (up to 12C) and extended operation within a fixed SoC window, it was decided to evaluate a test battery in accordance with the invention under PSoC/fast-charge EV conditions. Accordingly, the battery 1 in accordance with the invention and the representative battery of the prior art were operated continuously under the following three regimes applied sequentially.

Regime 1

The battery is discharged from 100% SoC at a given C rate of 21½ A to a nominal 20% SoC (based on Ahs).

Regime 2

The battery is charge at 6C (129 A) from a nominal 20% SoC until it reaches a nominal 80% SoC (based on Ahs). The battery is then discharged at the C rate (21½ A) to a nominal 20% SoC (based on Ahs). The charge-discharge operation between 20 and 80% SoC without full recharging is referred to as a "PSOC cycle." The PSOC process is continued for 24 PSOC cycles, or until the battery voltage at the end of discharge decreases to 11.1 V, at that point the battery is deemed to be at 10% SoC, eg., an initial PSoC operating window of 20–80% has become 10–70% SoC.

(Note:—one set of 24 PSoC cycles is referred to as a "master cycle").

Regime 3

(i) The battery is charged at 6C until the current falls to 5A;

(ii) The battery is then equalized with a constant current for a specified time.

The results of the cycling, expressed in terms of the end-of-discharge voltage (EoDV) at the completion of discharge in Regime 2, are shown in FIG. 8. The EoDV of the prior art battery initially increases in response to a rise in battery temperature, caused by the commencement of fast charging. The EoDV then decreases steadily from 11.75 to 11.45 V during the remainder of the master cycle, presumably as a result of charging inefficiencies. The EoDV recovered after equalization charging (Regime 3), but then decreased gradually to 11.45 V during the second master cycle. The EoDV after the 1st discharge of the third master cycle had decreased to 11.15 V, compared to 11.45 V during the first and second master cycles. This "irreversible" degradation of the EoDV continued, with the battery voltage reaching the cut-off limit of 11.10 V during the last discharge of the fourth master cycle. In all subsequent master cycles, the battery was unable to deliver 24 cycles before reaching the cut-off voltage.

The EoDV of the battery 1 in accordance with the invention remained at a much higher level throughout PSoC/fast-charge operation, compared to that of the representative battery of the prior art (FIG. 8). For example, the EoDV of the inventive battery 1 during the last discharge of the first and final master cycles were 11.70 and 11.50 V, respectively, compared 11.45 and 11.10 V for the prior art battery. Hence, the battery 1 in accordance with the invention is more resistant to capacity loss under PSoC/fast-charge duty and, as a consequence, was able to deliver the required number of PSoC cycles throughout all the testing period.

Both the prior art battery and the battery 1 in accordance with the invention used in these experiments was fitted with three internal thermocouples in order to measure "actual" operating temperature of the batteries during PSoC/fast-charge duty. The probes were installed in the third cell and were positioned between the middle negative plate and adjacent separator in the following positions:

(i) 1 cm from the top of the cell group;
(ii) middle of the cell group;
(iii) 1 cm from the bottom of the cell group.

Figure 9:
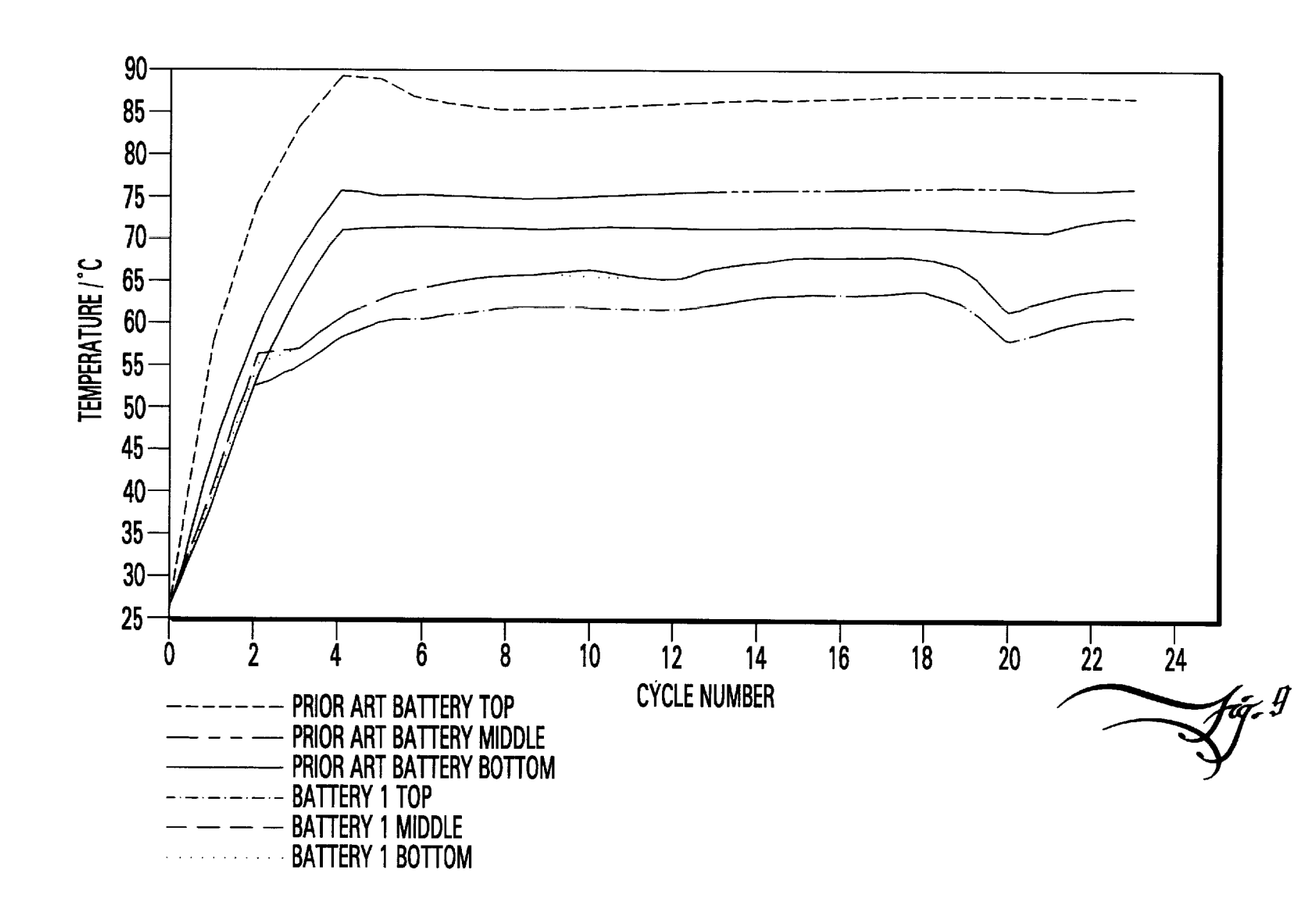
FIG. 9 is a graph showing only temperature (T) profiles, as graphed against number of test cycles, to afford comparison between the given single-tab battery of the prior art and the flat-plate dual-tab battery in accordance with the invention, likewise under conditions representative of PSoC/fast-charge EV duty.

FIG. 9 shows the internal temperature of both batteries at the completion of charging during a typical master cycle. A temperature gradient formed quickly in the prior art battery during initial operation. After four cycles, the internal battery temperature reached 90, 75 and 70° C. at the top, middle and bottom, respectively. The extent of the rise was surprising, given that the external temperature, measured at the hottest point on the outside of the battery case, was limited to 55° C.

The internal temperature of the dual-tab battery 1 in accordance with the invention increased gradually during initial PSoC/fast-charge operation, reaching approximately 65° after 15 cycles. During this time, the temperature differential from the top to the bottom of the battery did not exceed 5° C. Hence, the battery 1 in accordance with the invention has both a lower average battery temperature and a reduced internal temperature differential, compared to the single-tab battery of the prior art, when operated under PSoC/fast-charge conditions.

This improvement in performance is due to the dual-tab nature of the battery 1 in accordance with the invention. In prior art single-tab designs, there is a significant increase in current density, ie., there is "current concentration," towards the current takeoff, or tab, on the top of the battery plates during high-rate charge or discharge. As heating within batteries is related to both the square of the current and the resistance of the battery (ie., $I^2R$), high, localized current densities at the top of the plates can lead to large heating effects in these regions. The inclusion of a second current takeoff in accordance with the invention at the bottom of the plate leads to a lower, more even current density with the plate, thus reducing the overall amount of heat produced. Moreover, the dual-tab battery 1 in accordance with the invention provides even heat dissipation which results in even temperatures throughout the battery.

It has been demonstrated that the operation of the VRLA batteries under HEV duty can cause the build up of "refractory" or "hard" lead sulphate at the bottom of the negative plates. The phenomenon has been explained in terms of poor charge acceptance of the negative plates. The discovery of large internal temperature gradients as a result of high charge/discharge currents in this study, however, allows the representation of an additional hypothesis.

It is well known that if two batteries in parallel are operated at significantly different temperatures, the hotter battery will experience the highest active-material utilization during discharge. The hot battery will also accept the greatest amount of charge for a given charge time and top-of-charge voltage. Given that the top and bottom regions of a battery plate are effectively in parallel, it follows then that if they were at different temperatures, they would experience different degrees of active-material utilization during discharge. Also, the hotter locations would experience a higher degree of overcharge relative to the cooler areas.

This situation will lead to undercharging and sulphation of the cooler regions. The dual-tab design in accordance with the invention does not develop significant temperature gradients during either HEV or PSoC/fast-charge EV duty. Presumably it is for that reason that the inventive dual-tab battery does not suffer from preferential sulphation.

The improvements over the prior as shown by the foregoing graphs and which have been found for a flat-plate version of the dual-tab battery 1 in accordance with the invention are expected to be gotten in comparable measure for the spirally-wound version 40 of the dual-tab battery in accordance with the invention.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A valve-regulated lead acid battery cell of flat plural-tab plates, comprising:

an axially layered plurality of charged and oppositely-charged flat plural-tab plates, another plurality of separator media interleaved between at least that much of the flat plates generally exclusive of any tabs, and axially extending busbars arranged traversing the layers;

a sealed case providing a compartment for said cell and adapted for supporting the plates upright in generally vertical planes;

each upright plate having, exclusive of the tabs, spaced side edges extending between a spaced top and bottom edge, and further having top and bottom tabs protruding from the respective top and bottom edges which are co-planar with the rest of the flat plate;

the busbars including parallel charged and oppositely-charged upper busbars disposed across the top edges of the layered plates and connected with the top tabs of the charged and oppositely-charged plates respectively, as well as parallel charged and oppositely-charged lower busbars disposed under the bottom edges of the layered plates and connected with the bottom tabs of the charged and oppositely-charged plates respectively;

wherein each busbar either is adapted for direct connection to a terminal protruding externally from the case and/or alternatively is adapted for being in series by a fused linking connection with a like and axially-aligned busbar of alternate charge belonging to a like cell in a like and adjacent compartment across a cell partition of the case including for servicing by a distant connection with another terminal that protrudes externally from the case, said case accordingly providing charged and oppositely-charged upper terminals concurrently with charged and oppositely-charged lower terminals such that thermal transmission of current-resistive heating effects from the plates is conducted by the upper and lower parallel charged and oppositely-charged busbars to destinations externally from the case through the upper and lower charged and oppositely-charged terminals, concurrently, in order to eliminate or substantially reduce thermal gradients especially cooler lower regions, and thus achieve more even temperatures throughout said cell, which correspondingly eliminates or substantially reduces various deleterious consequences including preferential sulphation in cooler regions.

2. The battery cell of claim 1 wherein said plates are flat and arranged with co-planar tabs to achieve more axially-compact layering as well as more axially compact busbars to service the plate layers and thereby afford opportunity for shorter electrical and thermal transmission paths from plates to terminals.

3. The battery cell of claim 1 wherein said plates are oriented upright and terminate above and below in upper and lower extremities defined by the top and bottom tabs respectively in order that thermal transmission from the plates trends along paths with a substantial vertical component.

4. The battery cell of claim 1 wherein said tabs and busbars are laterally elongated to allow for heavy thermal transmission duty.

5. A valve-regulated lead acid battery comprising one or more cells according to claim 1 connected in series.

6. An electric or hybrid electric vehicle comprising one or more cells according to claim 1.

7. A plural-cell valve-regulated lead acid battery having cells of flat plural-tab plates, comprising:

a plurality of cells, each having an axially layered plurality of charged and oppositely-charged flat plural-tab plates, another plurality of separator media interleaved between at least that much of the flat plates generally exclusive of any tabs, and axially extending busbars arranged traversing the layers;

a sealed case for supporting the plurality of cells in an axial row and with the plates thereof upright in generally vertical planes, and including sufficient cell partitions for separating adjacent cells;

each upright plate having, exclusive of the tabs, spaced side edges extending between a spaced top and bottom edge, and further having top and bottom tabs protruding from the respective top and bottom edges and co-planar with the rest of the flat plate;

the busbars of each cell including parallel charged and oppositely-charged upper busbars disposed across the top edges of the layered plates and connected with the top tabs of the charged and oppositely-charged plates respectively, as well as parallel charged and oppositely-charged lower busbars disposed under the bottom edges of the layered plates and connected with the bottom tabs of the charged and oppositely-charged plates respectively;

a multiplicity of partition-traversing links such that each busbar is adapted for connecting in series by a respective partition-traversing link with an in-row axially-aligned busbar of alternate charge belonging to an adjacent cell in an adjacent compartment wherein said respective link traverses the respective interposed cell partition; and terminals, which protrude externally of the case, being connected inside the case to given ones of the busbars wherein the terminals include charged and oppositely-charged upper terminals connected to at least one charged and oppositely-charged upper busbar respectively as well as include charged and oppositely-charged lower terminals connected to at least one charged and oppositely-charged lower busbar respectively such that thermal transmission of current-resistive heating effects from the plates is conducted by the upper and lower parallel series of busbars to destinations externally from the case through the upper and lower charged and oppositely-charged terminals, concurrently, in order to eliminate or substantially reduce thermal gradients especially cooler lower regions, and thus achieve more even temperatures throughout said cells and said battery, which correspondingly eliminates or substantially reduces various deleterious consequences including preferential sulphation in cooler regions.

8. The battery of claim 7 wherein each of all the partition-traversing links either extends through an opening therefor in the respective cell partition or else, under- or over-laps the respective cell partition.

9. The battery of claim 7 wherein said plates are flat and arranged with co-planar tabs to achieve relatively more axially-compact layering as well as more axially compact busbars to service the plate layers and thereby afford opportunity for shorter electrical and thermal transmission paths from plates to terminals.

10. The battery of claim 7 wherein said tabs and busbars are laterally elongated to allow for heavy thermal transmission duty.

11. The battery of claim 7 wherein said plates are oriented upright and terminate above and below in upper and lower extremities defined by the top and bottom tabs respectively in order that thermal transmission from the plates generally trends along paths with a substantial vertical component.

12. The battery of claim 7 wherein said busbars are aligned in series in parallel rows both above and below the plates, and the upper and lower terminals protrude through a top and bottom of the case respectively to define the elevational high and low extremes respectively of the battery in order to provide more even distribution of current and thermal circulation, as well as more even distribution of current density throughout the plates, for eliminating uneven heat production and simultaneously reducing overall heat production during high cycles of fast charge and discharge duty under partial state-of-charge conditions.

13. The battery of claim 7 wherein said case extends axially between spaced ends, said terminals being arranged such that either a charged or oppositely-charged upper terminal is disposed proximate one end as the other of a charged or oppositely-charged upper terminal is disposed proximate the other end, and likewise alternately a charged or oppositely-charged lower terminal is disposed proximate the one end as the other of a charged or oppositely-charged lower terminal is disposed proximate the other end, whereby terminals are distributed widely spaced apart to better service the thermal extraction of the current-resistive heating effects induced by the plates and/or busbars and eliminate relative hot-spots from developing in any under-served regions.

14. The battery of claim 7 wherein the cell compartments either are independently sealed airtight or have at least a common headroom.

15. A plurality of valve-regulated lead acid batteries comprising at least two batteries according to claim 7 connected in series.

16. An electric or hybrid electric vehicle comprising one or more batteries according to claim 7.

17. A plural-cell valve-regulated lead acid battery having cells of flat plural-tab plates, comprising:

a plurality of cells, each having an axially layered plurality of charged and oppositely-charged flat plural-tab plates and another plurality of separator media interleaved between at least that much of the flat plates generally exclusive of any tabs;

a sealed case for supporting the plurality of cells in an axial row and including sufficient cell partitions for separating adjacent cells;

each plate having, exclusive of the tabs, a periphery, and further having plural, generally diametrically-opposed tabs protruding from within diametrically-opposed first and second segments of the periphery respectively, said tabs being co-planar with the rest of the flat plate;

each cell further having busbars including parallel charged and oppositely-charged first busbars disposed axially traversing the first segments of the layered plates and connected with the extending tabs of the charged and oppositely-charged plates respectively, as well as parallel charged and oppositely-charged second busbars disposed axially traversing the second segments of the layered plates and connected with the extending tabs of the charged and oppositely-charged plates respectively;

terminals, which protrude externally of the case, being connected inside the case to given ones of the busbars of given cells wherein the terminals comprise generally diametrically-opposed first and second terminals include charged and oppositely-charged first terminals connected to at least one charged and oppositely-charged first busbar respectively as well as include charged and oppositely-charged second terminals connected to at least one charged and oppositely-charged second busbar respectively; and, a multiplicity of partition-traversing links such that each busbar is adapted for connecting in series by a respective partition-traversing link with an in-row axially-aligned busbar of alternate charge belonging to an adjacent cell in an adjacent compartment wherein said respective link traverses the respective interposed cell partition.

18. The battery of claim 17 wherein each of all the partition-traversing links either extends through an opening therefor in the respective cell partition or else laps the periphery of the respective cell partition.

19. The battery of claim 17 wherein said plates are flat and arranged with said co-planar tabs to achieve more axially-compact layering as well as more axially compact busbars to service the plate layers and thereby afford opportunity for shorter electrical and thermal transmission paths from plates to terminals.

20. The battery of claim 17 wherein said busbars are aligned in series in parallel rows traversing both the first and second segments of the plates, and the first and second terminals protrude through a top and bottom of the case respectively to define the elevational high and low extremes respectively of the battery in order to provide more even distribution of current and thermal circulation, as well as more even distribution of current density throughout the plates, for eliminating uneven heat production and simultaneously reducing overall heat production during high cycles of fast charge and discharge duty under partial state-of-charge conditions.

21. The battery of claim 17 wherein said case extends axially between spaced ends, said terminals being arranged such that either a charged or oppositely-charged first terminal is disposed proximate one end as the other of a charged or oppositely-charged first terminal is disposed proximate the other end, and likewise alternately a charged or oppositely-charged second terminal is disposed proximate the one end as the other of a charged or oppositely-charged second terminal is disposed proximate the other end, whereby terminals are distributed widely spaced apart to better service the thermal extraction of the current-resistive heating effects induced by the plates and/or busbars and eliminate relative hot-spots from developing in any under-served regions.

22. The battery of claim 17 wherein the cell compartments either are independently sealed airtight or have at least a common headroom.

* * * * *